United States Patent
Hollingsworth et al.

(10) Patent No.: US 6,199,003 B1
(45) Date of Patent: Mar. 6, 2001

(54) APPARATUS AND METHOD FOR MANUALLY SHIFTING AN AUTOMATIC TRANSMISSION

(75) Inventors: Rita D. Hollingsworth, Ortonville; John M. Rzepecki, II, Clinton Township; Scott A. Miller, Rochester Hills; Edward W. Czarnecki, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/316,946

(22) Filed: May 21, 1999

(51) Int. Cl.⁷ .................................................. F16H 59/04
(52) U.S. Cl. ............................................. 701/52; 74/335
(58) Field of Search ................... 701/51, 52; 74/473.18, 74/335

(56) References Cited

U.S. PATENT DOCUMENTS

| | | | |
|---|---|---|---|
| 4,875,391 | 10/1989 | Leising et al. | 74/866 |
| 5,509,322 | 4/1996 | Anderson et al. | 74/335 |
| 5,680,307 | 10/1997 | Issa et al. | 364/424.081 |
| 5,722,292 | 3/1998 | Anderson et al. | 74/335 |
| 5,767,769 | 6/1998 | Issa | 340/456 |
| 6,035,734 | * 3/2000 | Le Van | 74/335 |
| 6,085,139 | * 7/2000 | Nakauchi et al. | 701/52 |
| 6,089,118 | * 7/2000 | Iishii et al. | 74/473.18 |

OTHER PUBLICATIONS

1. "S–M–O–O–O–O–T–H: Saturn automatic combines technology and cost saving" article, one page, Automotive News, Oct. 15, 1992.
2. "Driving With Dedra–13 Lancia's new four–speed electronic transmission—the Dedra 2.0 i.e." article, page 105, Automotive Industries, Sep. 1992.

* cited by examiner

*Primary Examiner*—Michael J. Zanelli
(74) *Attorney, Agent, or Firm*—Roland A. Fuller, III

(57) ABSTRACT

An apparatus and method for providing manual shift modes for an automatic transmission for a motor vehicle is provided. A plurality of sensors are coupled to the automatic transmission and the motor vehicle and are adapted to sense a plurality of parameters thereof and produce a plurality of respective sensor signals. An input device, responsive to manipulation by a driver, is adapted to produce one of an upshift signal and a downshift signal and a mode setting signal in response thereto. A controller is coupled to the automatic transmission and the input device and is adapted to receive the mode setting signal and the sensor signals and select one of a first and second manual modes in response thereto and to receive one of the upshift and downshift signals and responsively shift the automatic transmission in response to the sensor signals and the selected one of the first and second manual modes.

16 Claims, 9 Drawing Sheets

APPARATUS AND METHOD FOR MANUALLY SHIFTING AN AUTOMATIC TRANSMISSION

I. FIELD OF THE INVENTION

The present invention relates generally to an apparatus and method for manually shifting an automatic transmission, and more particularly, to an apparatus and method for providing an apparatus and method for changing the characteristics of a manual shift method of an automatic transmission.

II. BACKGROUND ART

Automotive vehicles require a power train to transmit the force of an engine to the wheels of the vehicle. The power train's main component is typically referred to as the transmission. The transmission converts engine speed and torque in accordance with the tractive-power demand of the vehicle. Transmissions are generally, either manually or automatically actuated. Manual transmissions generally include mechanical mechanisms for coupling rotating gears to produce different ratio outputs to drive the wheels. Automatic transmissions are designed to take automatic control of the frictional units, gear ratio selection and gear shifting.

Vehicles equipped with automatic transmissions are generally easier to operate with a gear selection process generally adapted to favor fuel economy and smooth shifts. However, some drivers may favor the more aggressive performance and feel of a manual transmission in exchange for lower fuel economy and lower ease of use.

One approach has been to provide for manual shifting of the automatic transmission through a gear shift lever. However, previous attempts to provide manual modes of operation have provided a single mode of manual operation. One inherent problem in providing a single mode of manual operation is that the mode must balance performance and fuel economy, i.e., increased performance typically has a negative effect on fuel economy. Different drivers desire different trade-offs, e.g., more performance with less fuel economy or more fuel economy with less performance.

The present invention is aimed at overcoming one or more of the problems as set forth above.

III. SUMMARY OF THE INVENTION

In one aspect of the present invention, an apparatus for providing manual shift modes for an automatic transmission for a motor vehicle is provided. A plurality of sensors are coupled to the automatic transmission and the motor vehicle and are adapted to sense a plurality of parameters thereof and produce a plurality of respective sensor signals. An input device, responsive to manipulation by a driver, is adapted to produce one of an upshift signal and a downshift signal and a mode setting signal in response thereto. A controller is coupled to the automatic transmission and the input device and is adapted to receive the mode setting signal and the sensor signals and select one of a first and second manual modes in response thereto and to receive one of the upshift and downshift signals and responsively shift the automatic transmission in response to the sensor signals and the selected one of the first and second manual modes.

In another aspect of the present invention, a method for providing first and second manual shift modes for an automatic transmission is provided. The method includes the steps of selecting a selected manual mode as one of the first and second manual modes, sensing a plurality of parameters related to the automatic transmission and producing a plurality of respective sensor signals, and receiving one of an upshift and a downshift signal in response to manipulation of an input device by a driver. The method further includes the step of receiving the sensor signals and the one of the upshift and downshift signals and shifting the automatic transmission as a function of the sensor signals and a first set of operating characteristics in response to the selected manual mode being equal to the first manual mode and a second set of operating characteristics in response to the selected manual mode being equal to the second manual mode.

IV. BRIEF DESCRIPTION OF THE DRAWINGS

V. DETAILED DESCRIPTION OF THE PREFERRED EMBODIMENT

With reference to the drawings, and in operation, the present invention provides an apparatus 102 and method for providing manual shift modes for an automatic transmission 104.

A. Operation of the Automatic Transmission

Figure 1:
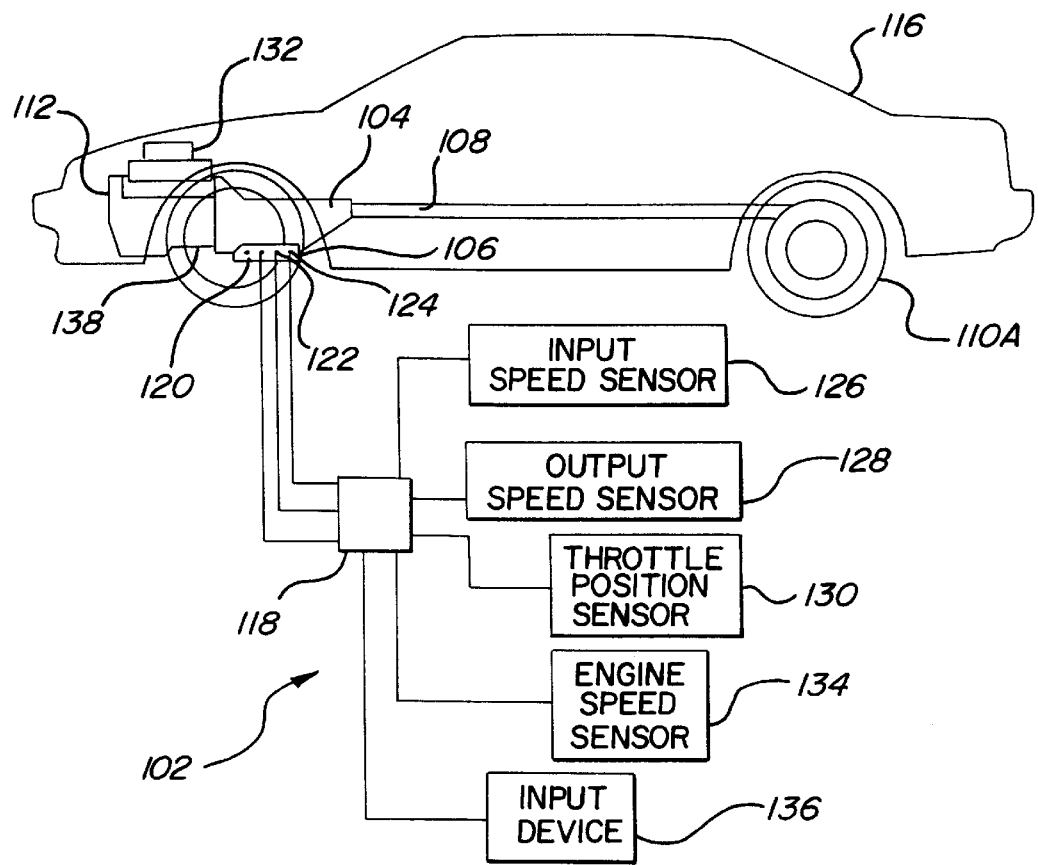
FIG. 1 is a diagrammatic view of a vehicle with an automatic transmission and an apparatus for manually controlling the automatic transmission, according to an embodiment of the present invention.

With specific reference to FIG. 1, the automatic transmission 104 is shown having a valve body 106 and an output shaft 108. The automatic transmission 104 provides a gearing interface between two driven wheels 110A, 110B (only one of which are shown) and an internal combustion engine 112 to adjust the torque and speed provided to the output shaft 108 from the internal combustion engine 112.

The automatic transmission 104 can select between four or five gear ratios, three or four forward gear ratios and one reverse gear ratio, for providing the optimum gear ratio between the output shaft 108 and the internal combustion engine 112. To change from one gear ratio to another, the valve body 106 hydraulically communicates with a plurality of bands, gears, and clutches (not shown) to cause clamping thereof around various portions of planetary gear sets (not shown) within the automatic transmission 104.

This clamping and unclamping regulates the rotation of the planetary gear sets which, in turn, selects a specific gear ratio for automatic transmission 104. The output shaft 108 is coupled to the driven wheels 110A, 110B through a differential 114 to drive the vehicle 116.

Referring to FIG. 1, a controller or electronic control module 118 electrically communicates with valves 120, 122, 124 of valve body 106 to actuate various combinations of bands and clutches to adjust the gear ratio as discussed above.

The controller 118 includes a processor. The term processor is meant to include microcomputers, microprocessors, integrated circuits, etc . . . , all of which are capable of being programmed. The controller 118 is adapted to receive input signals from various sensors and input devices and to responsively control the automatic transmission 112.

Each valve 120, 122, 124 is operated by an electronically controlled solenoid (not shown) which is actuated by the controller 118 to apply or remove hydraulic pressure to specific bands or clutches, thereby adjusting the gear ratio of automatic transmission 104.

To determine the proper gear ratio for automatic transmission 104, the controller 118 must analyze a number of factors which include the current gear ratio of automatic transmission 104, speed of vehicle 118 (as a function of the transmission output speed), throttle position and engine speed, i.e., input speed of the automatic transmission 104.

A plurality of sensors are coupled to the automatic transmission 104 and are adapted to sense a plurality of parameters related to the automatic transmission 104 and produce a plurality of respective sensor signals. In the preferred embodiment, the plurality of sensors includes an input speed sensor 126, an output speed sensor 128, a throttle position sensor 130, and an engine speed sensor 132.

The input speed sensor 126 determines the rotational input speed of the automatic transmission 104. Likewise, the output speed sensor 128 provides an input to controller 118 representative of the velocity at which the vehicle 116 is traveling. To determine the present gear ratio in which the automatic transmission 104 is operating, the input speed sensor 126 is compared to the output speed sensor 128. The ratio of these sensors is determinative of the gear ratio of automatic transmission 104.

The throttle position sensor 130 detects the amount of opening of a throttle blade 132. Lastly, the engine speed sensor 132 determines the revolutions per minute in which internal combustion engine 112 is turning.

The current gear ratio of the automatic transmission 104 is determined by the controller 118 and is a function of a selected position of an input device 136 and the measured parameters.

Figure 2:
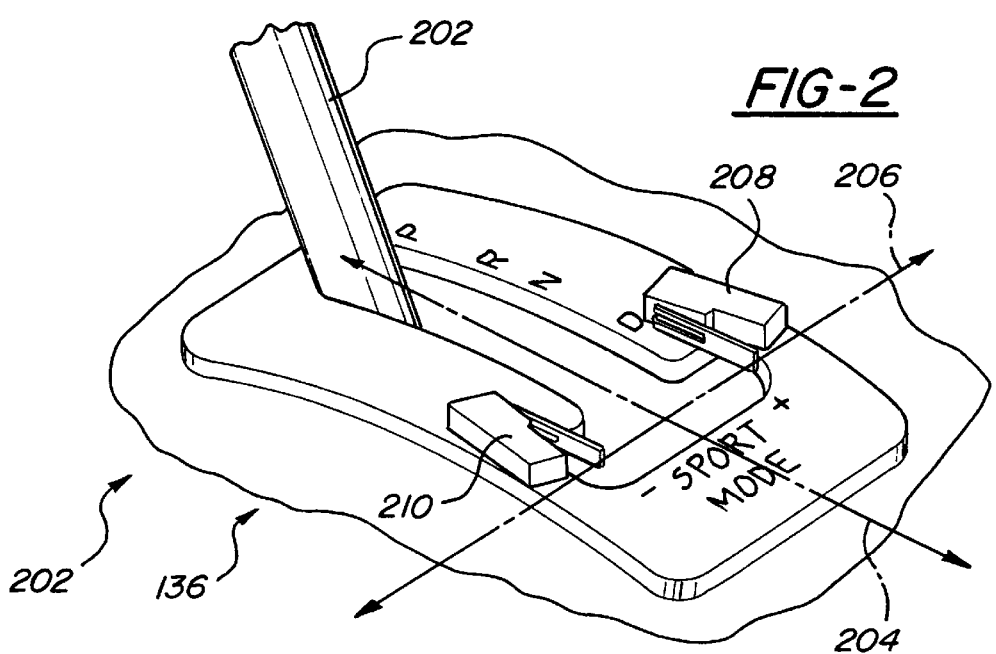
FIG. 2 is a diagrammatic view of an input device for manually shifting the automatic transmission of FIG. 1.

With reference to FIG. 2, in the preferred embodiment the input device 136 includes a gear shift lever 202. Typically, the gear shift lever 202 has a number of positions, for example, park, overdrive, one or more low gear positions (not shown), neutral and reverse. As shown, the gear shift lever 202 is movable along a first axis 204 to select one of the transmission modes.

The low gear positions limit the gear ratio, to one of the lower gears, e.g., second or third. The reverse position places the transmission in the reverse gear.

When the gear shift lever 202 is in the overdrive position the automatic transmission 104 and the controller 118 are selected to be in a first automatic mode, i.e., overdrive. In the first automatic mode, the controller 118 selects one of the forward gears based on vehicle parameters and a set of shift schedules (usually stored in lookup tables). Generally, the automatic transmission is designed to maximize fuel economy and provide smooth shifts while in the first automatic mode.

The above described automatic transmission and variations and modifications thereof are well known in the art. As such, the skilled artisan will appreciate that the present invention may be used with any of these modifications or variations and is not limited to the automatic transmission described herein.

As stated above, the first automatic mode of operation is aimed at maximizing fuel economy. However, an operator may desire a more "aggressive" feel and performance driven transmission. The present invention provides a more aggressive operation via a second automatic mode.

In the preferred embodiment, the driver selects one of the first and second modes via the input device 136. As discussed below, the input device includes a first mode position and a second mode position. As shown, in the preferred embodiment the second mode position is labeled "Sport". When the driver places the input device 136 in the first mode position or the second mode position, a respective first mode signal or second mode signal is produced.

As in the first automatic mode, in the second automatic mode the transmission controller 118 selects one of the forward gears based on vehicle parameters and a set of shift schedules (usually stored in lookup tables). To achieve the desired performance characteristics in the transmission, the present invention modifies operation of the transmission using one or more of the methods discussed below.

Figure 3:
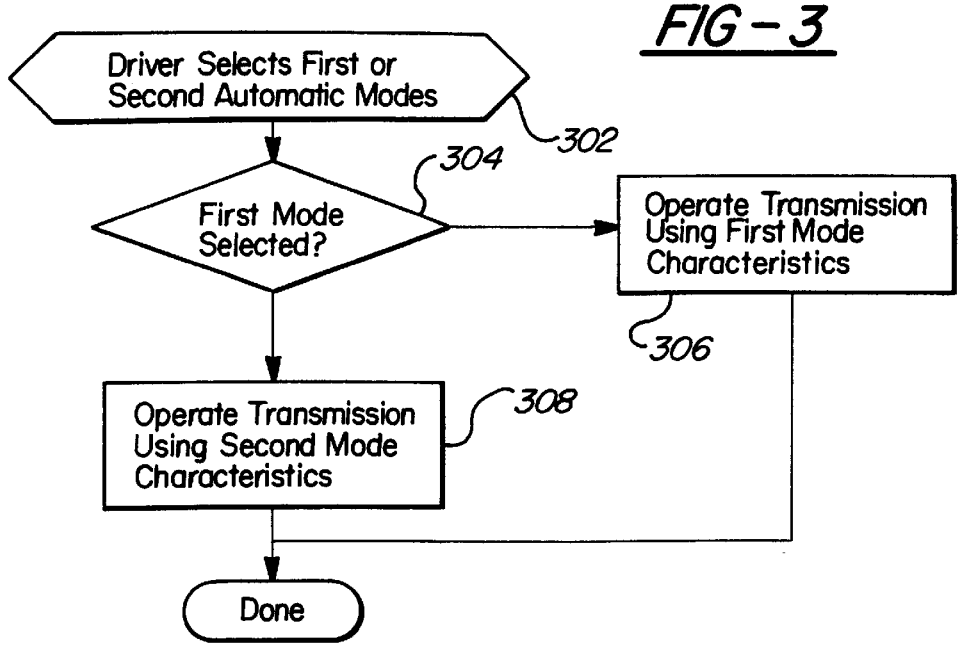
FIG. 3 is a flow diagram of the operation of an automatic transmission with first and second modes of operation, according to an embodiment of the present invention.

With reference to FIG. 3, the general operation of the present invention in accordance with an embodiment of the present invention will now be described. In a first control block 302, the driver selects one of the first or second automatic control modes. In a first decision block 304, if the first mode was selected by the driver then control proceeds to a second control block 306. Otherwise control proceeds to a third control block 308.

In the second control block 306, the automatic transmission 104 is controlled automatically using a set of first mode characteristics (see below). In the third control block 308, the automatic transmission 104 is controlled automatically using a set of second mode characteristics (see below).

As described above, the controller 118 is coupled to the automatic transmission 104 and the input device 136 and is adapted to receive the signals from the sensors 126, 128, 130, 132 and the first mode signal or second mode signal produced by the input device 136. The controller 118 automatically shifts the automatic transmission 104 in response to the sensor signals and the received mode signal. The controller 118 is programmed to provide a first set of operating characteristics in response to receiving the first mode signal and to provide a second set of operating characteristics in response to receiving the second mode signal.

Operation of the automatic transmission 104 in the first and second automatic control modes is more fully disclosed in U.S. patent application Ser. No. 09/316,605, titled "Apparatus and Method for Providing Automatic Shift Modes in an Automatic Transmission", filed concurrently.

B. Manual Operation of the Automatic Transmission—Overview

The controller 118 is coupled to the automatic transmission 104 and to the input device 134. The driver of the vehicle 116 manipulates the gear shift lever 202 to operate the transmission in the automatic modes and to manually operate the automatic transmission 104 and to select the manual mode (see below).

With reference to FIG. 2, in the preferred embodiment the input device 134 is integral with a gear shift lever 202. The gear shift lever 202 is operable along a first linear axis 204 for operation of the automatic transmission in its automatic modes in the conventional manner.

The gear shift lever 202 is also operable along a transverse linear axis 206. Operation of the gear shift lever 202 along the transverse linear axis 206 enters directs the controller 118 to manually control the automatic transmission 104.

In the manual mode, the current gear of the automatic transmission 104 is chosen by the user through operation of the gear shift lever 202 along the transverse axis 206. Movement of the gear shift lever 202 along the transverse axis 206 towards the "+" will direct the controller 118 to shift the automatic transmission 104 to the next gear. Movement of the gear shift lever 202 along the transverse axis 206 towards the "−" will direct the controller 118 to (down) shift the automatic transmission 104 to the previous gear. Movement of the gear shift lever 202 along the transverse axis 206 triggers first and second switches 208, 210 which transmit respective signals to the controller 118.

Operation of an automatic transmission in a manual mode using a gear shift lever is disclosed in U.S. Pat. No. 5,680,307 issued to Nabil M. Issa et al on Oct. 21, 1997, which is herein incorporated by reference. A suitable gear shift lever is disclosed in the following U.S. Pat. Nos., which are also incorporated by reference:

5,509,322 issued to Arthur Anderson et al on Apr. 23, 1996, 5,722,292 issued to Arthur Anderson et al on Mar. 3, 1996, and 5,767,769 issued to Nabil M. Issa on Jun. 16, 1998.

C. Manual Operation of Automatic Transmission in Manual Modes

1. Overview

Figure 4:
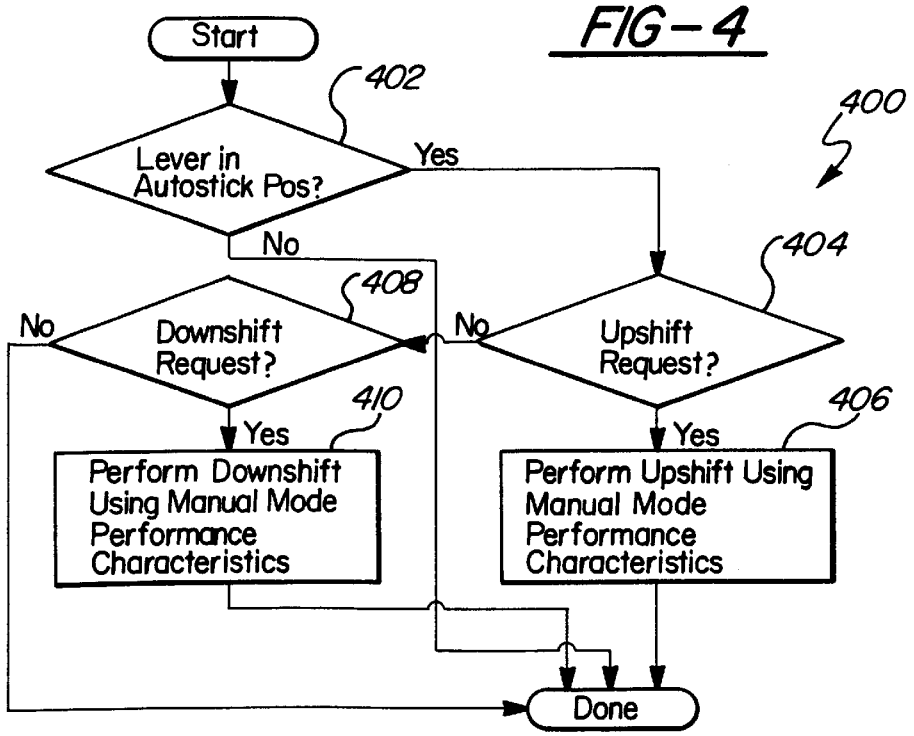
FIG. 4 is a flow diagram of the operation of manually shifting an automatic transmission, according to an embodiment of the present invention.

With reference to FIG. 4, the present invention provides an apparatus 102 which allows the driver to select a mode of operation for manually shifting the automatic transmission 104. In one embodiment, the apparatus 102 allows the driver to select between a first and second manual mode. In another embodiment, the apparatus 102 allows the driver to select between first, second, and third manual modes.

As mentioned above, in the manual mode the driver controls shifting of the automatic transmission 104 through manipulation of the input device 138. When the driver indicates an upshift or downshift is desired, the transmission controller 118 shifts the transmission 104. Selection of a desired one of the manual modes, allows the driver to determine the feel or performance of the shifts.

With reference to FIG. 4, manual operation of the automatic transmission will now be discussed with regard to a first control routine 400. In a first decision block 402, the controller 118 determines if the apparatus 102 is in the manual mode. In the preferred embodiment, the driver indicates desire for the manual mode by pulling the gear shift lever 202 past the Overdrive position and into the Sport Mode position (labeled "Sport").

If the gear shift lever 202 is in the Sport Mode position, control proceeds to a second decision block 404. If the gear shift lever 202 is not in the sport mode position, then the first control routine 400 is exited.

In the second decision block 404, the routine 400 checks for an upshift request, i.e., whether the driver has placed the lever 202 in the "+" position.

If an upshift has been requested, then control proceeds to a first control block 406. In the first control block 406, an upshift is performed using the manual mode performance characteristics (see below). The control routine 400 is then exited.

If in the second decision block 404, an upshift has not been requested, then control proceeds to a third decision block 408. In the third decision block 408, the routine 400 checks for a downshift request, i.e., whether the driver has placed the lever 202 in the "−" position.

If a downshift has requested, then control proceeds to a second control block 406. In the second control block 408, a downshift is performed using the manual mode performance characteristics (see below). The control routine 400 is then exited.

If in the third decision block 408, a downshift has not been requested, then the routine is then exited.

When the driver indicates a shifting of the automatic transmission 104 to a lower gear ratio, the transmission controller 118 sets a desired output acceleration. The desired output acceleration is used to determine how quickly the clutches should engage and reach the new gear ratio.

The valves 120, 122, 124 are electronically controlled to provide hydraulic fluid to the clutches. Engagement of a clutch has two phases. First, the clutch must be filled with hydraulic fluid. Once filled, the clutch will begin to engage as additional fluid flow is provided until it is fully engaged. The rate of fluid flow during each of these phases controls the rate and "feel" of the shifting operation.

When the driver indicates a shifting of the automatic transmission 104 to a higher gear ratio, the transmission controller 118 sets a desired output acceleration. The desired output acceleration is used to determine how quickly the clutches should engage and reach the new gear ratio.

2. Selecting and Displaying a Manual Mode

The input device 134 is adapted to produce a mode setting signal in response to manipulation by a driver. To select a manual mode, the driver first pulls back and places the gear shift lever 202 in the manual or Autostick position (as shown in FIG. 2 labeled "Sport"). Several other conditions must exist before the transmission controller 118 will cycle the manual control modes. i.e., the motor vehicle must be stopped and the brake pedal must be depressed.

Once these conditions are met the driver may cycle through and select a manual mode through the gear shift lever. In a first embodiment, the driver cycles through the control modes by holding the lever 202 in the "−" position. In a second embodiment, the driver cycles through the control modes by holding the lever 202 in the "+" position. In a third embodiment, the driver cycles through the control modes in one direction, i.e., first, second and third control mode, by holding the lever 202 in the "+" position and in the opposite direction, i.e., third, second, and first control modes.

Figure 5:
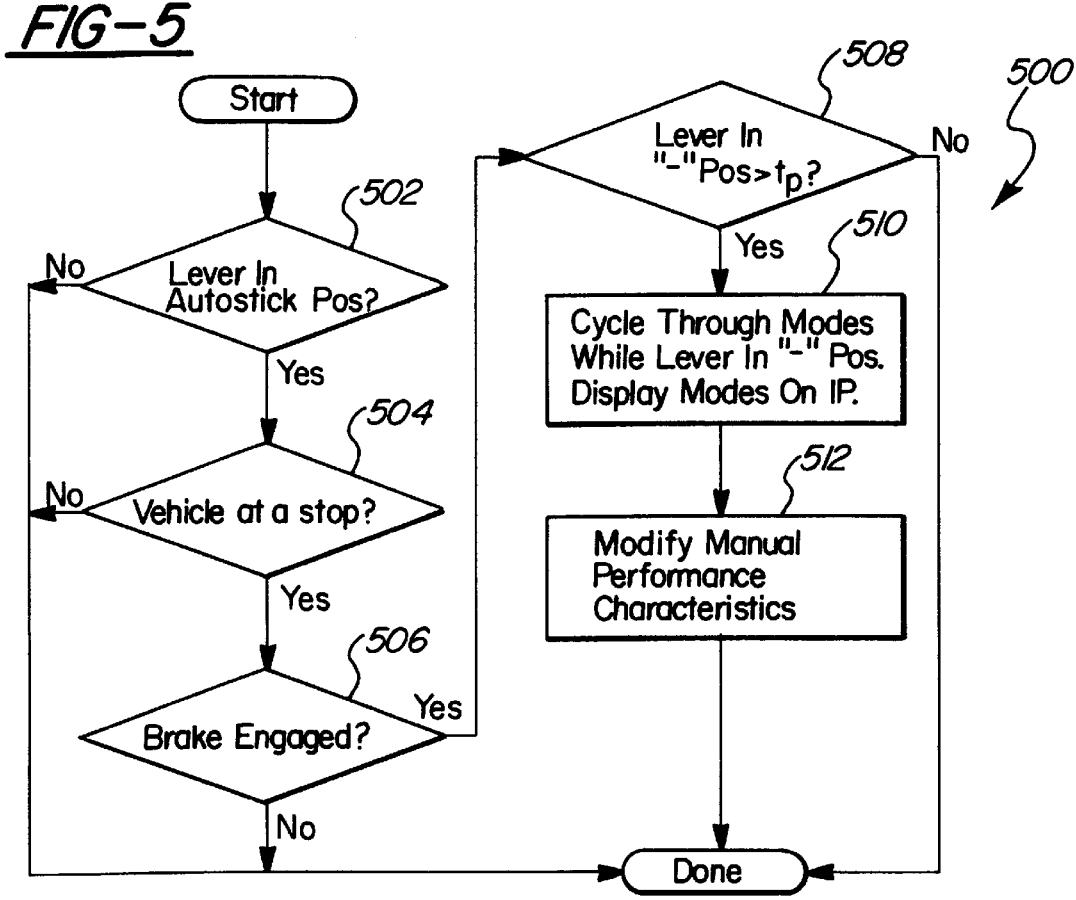
FIG. 5 is a flow diagram of the operation of selecting a manual mode of manually shifting an automatic transmission, according to an embodiment of the present invention.

With reference to FIG. 5, operation of the Mode Selection Routine 500 according to the first embodiment is illustrated for exemplary purposes. In a first decision block 502, the transmission controller detects whether the driver has placed the gear shift lever 202 in the Autostick position. If the routine 500 detects the Autostick position, then control proceeds to a second decision block 504. If not, then the Mode Selection Routine 500 exits.

In the second decision block 504, if the vehicle is at a stop (velocity equals zero) then control proceeds to a third decision block 506. If the vehicle is not at a stop, then the Mode Selection Routine 500 exits.

In the third decision block 506, if the brakes are engaged, i.e., brake pedal depressed, then control proceeds to a fourth decision block 508. If the brakes are not engaged, then the Mode Selection Routine 500 exits.

In the fourth decision block 508, the routine 500 checks to determine if the gear shift lever 202 has been in the "−" position for a time period longer than a predetermined threshold. If the gear shift lever 202 has been held in the "−" position longer than the predetermined threshold, then control proceeds to a first control block 510. If not, then the Mode Selection Routine 500 exits.

In the first control block 510, the transmission controller 118 cycles through the manual control modes while the gear shift lever 202 is held in the "−" position.

Figure 6:
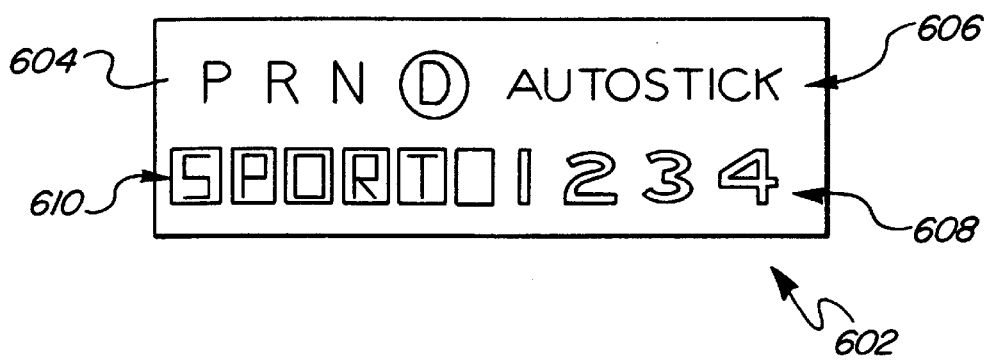
FIG. 6 is a diagrammatic illustration of an exemplary instrument panel.

Once the lever 202 is released, the last manual mode is selected. In a second control block 512, the manual mode performance characteristics are modified to implement the selected mode (see below) With reference to FIG. 6, a portion of an exemplary instrument panel 602 is illustrated. The instrument panel 602 include "P", "R","N" and Overdrive indicators 604 which are lit to reflect position of the gear shift lever 202 in the respective position. An "Autostick" indicator 606 is lit when the driver places the transmission controller 118 in one of the manual modes. Gear ratio indicators 608 ("1", "2", "3", "4") are used while in one of the manual modes to indicate the current gear ratio.

A series of alphanumeric displays 610 are used to provide different information to the driver. For example, the alphanumeric displays 610 are generally used to implement an odometer showing the total miles driven on the vehicle or per trip. Additionally, the transmission controller 118 may display the manual modes as the driver cycles through the modes during the selection process. In one embodiment, the first, second, and third modes are named "Sport", "Normal", and "Luxury". As shown, the alphanumeric displays 610 will cycle through the modes one by one ("SPORT" is shown for illustration purposes).

The manual modes provides an opportunity to the driver to select the "feel" or performance of shift operations. Generally each mode will provide a different feel to the shift operations than the other modes.

In the one embodiment, first and second manual modes are provided. The first manual mode provides more aggressive, faster shifts. While the second manual mode provides less aggressive shifts in exchange for better fuel economy.

In the another embodiment, first, second and third manual modes are provided. Of the three modes, the first manual mode provides for the quickest clutch engagement. The second manual mode provides for slower clutch engagement. While the third manual mode provides the slowest clutch engagement and smoothest shift.

3. Shifting the Transmission to a Lower Gear Ratio

Figure 7:
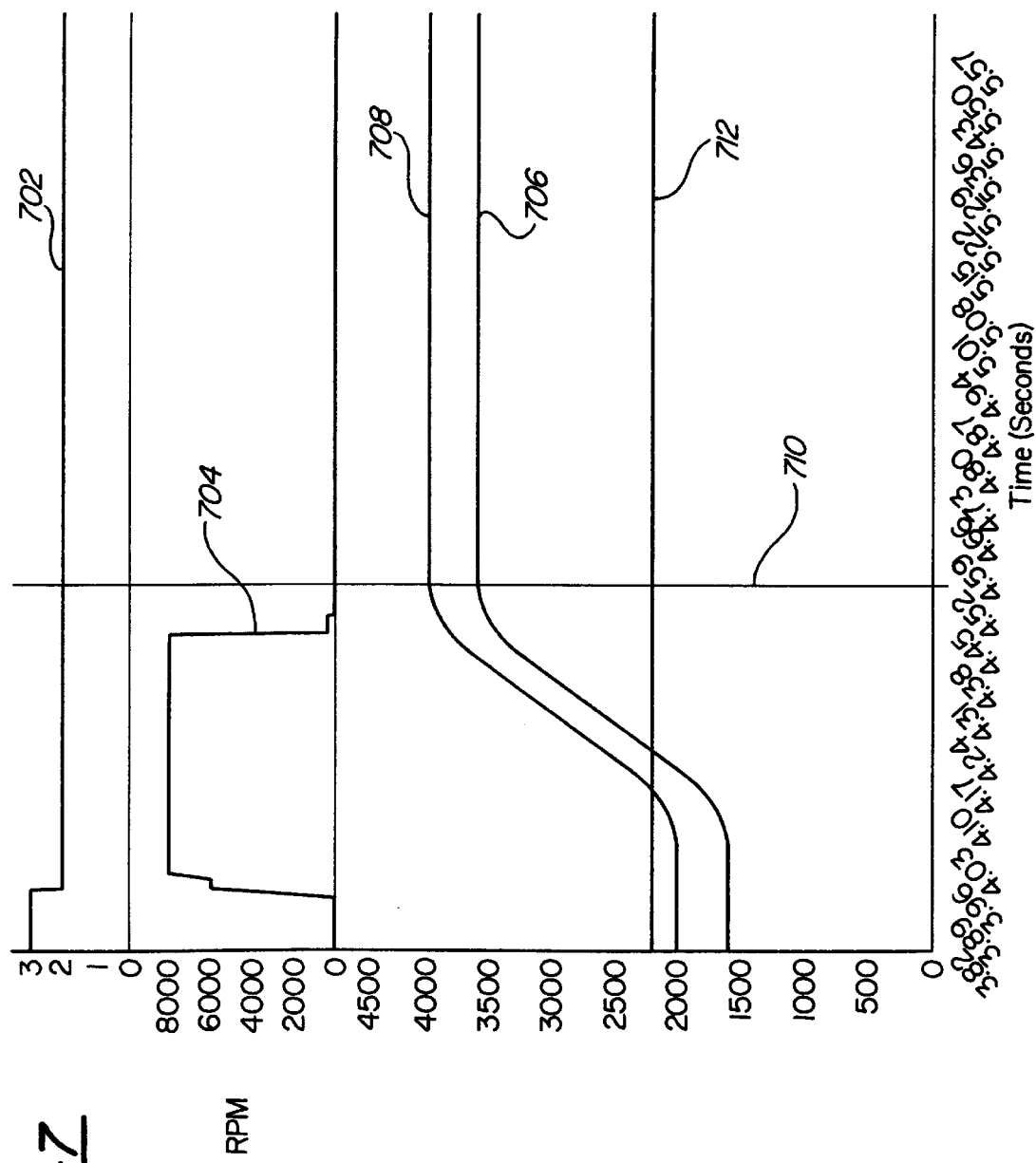
FIG. 7 is an exemplary graph illustrating a kickdown operation of an automatic transmission in a first manual mode, according to an embodiment of the present invention.

With reference to FIGS. 7, operation of the automatic transmission 104 and the controller 118 in the first manual mode is illustrated during a kickdown operation.

First, the controller determines that a down shift is required (based on driver manipulation of the gear shift lever 202). The trace 702 represents the request for a downshift, i.e., the call for a kickdown to change the gear ratio. In order to accomplish the downshift, the controller 118 sets a desired output acceleration (trace 704) of the transmission. The desired output acceleration is used to determine how quickly the clutches should engage and reach the new gear ratio.

Engine speed and torque converter turbine speed increase (traces 706, 708, respectively). When the transmission controller 118 calls for a kickdown, the controller 118 actuates the appropriate valves 120, 122, 124 to release and engage the clutches needed to shift the automatic transmission 104. Once the correct gear ratio is achieved (transmission output speed vs. transmission input speed), the controller 118 completely engages the clutches. As shown in FIG. 7, the clutches are fully engaged and the desired gear ratio is achieved at approximately 4.55 seconds (line segment 710).

The valves are electronically controlled to provide hydraulic fluid to the clutches. Engagement of a clutch has two phases. First, the clutch must be filled with hydraulic fluid. Once filled, the clutch will begin to engage as additional fluid flow is provided until it is fully engaged. The rate of fluid flow during each of these phases controls the rate and "feel" of the shifting operation.

Figure 8:
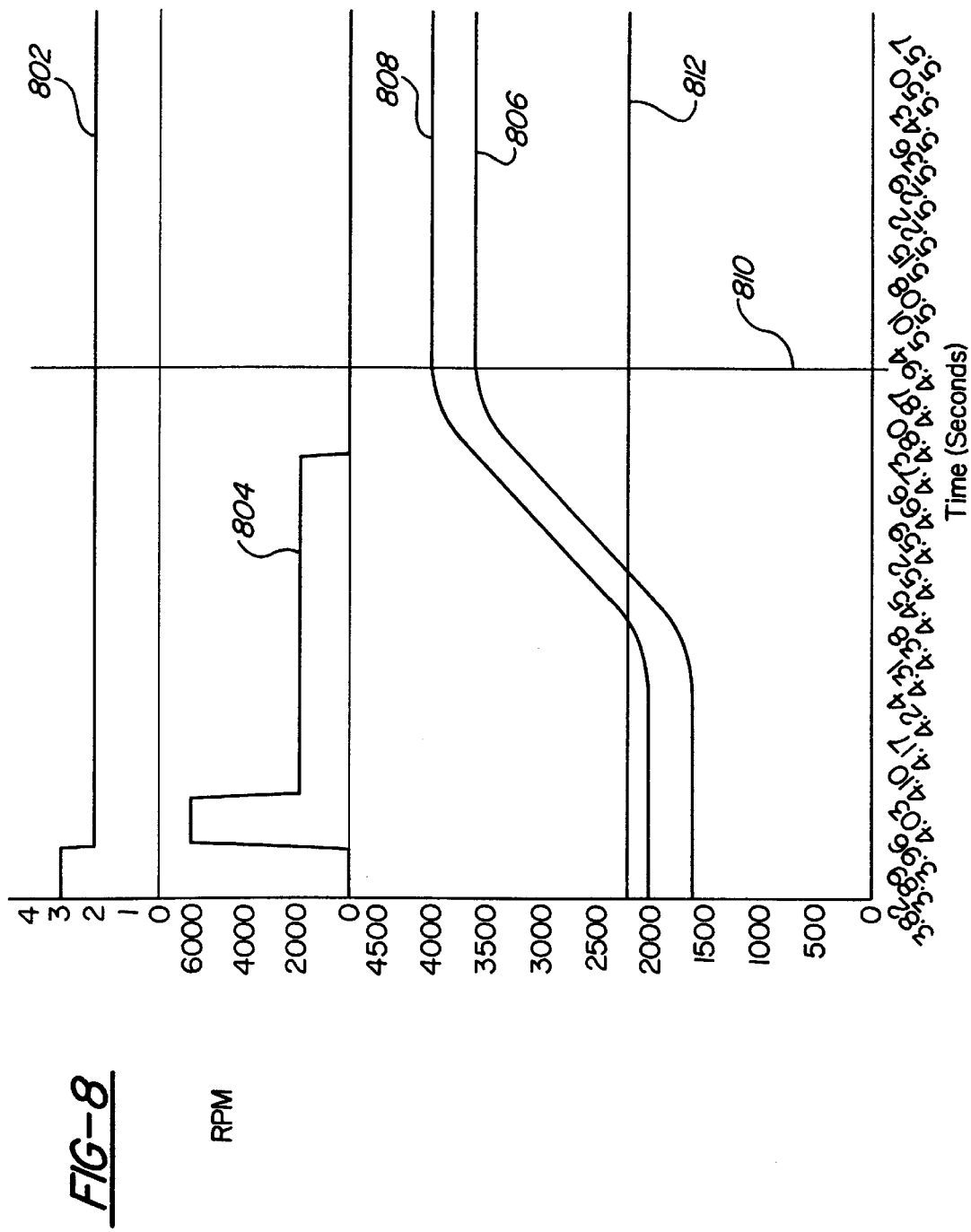
FIG. 8 is an exemplary graph illustrating a kickdown operation of an automatic transmission in a second manual mode, according to an embodiment of the present invention.

With reference to FIG. 8, operation of the automatic transmission 104 and the controller 118 in the second manual mode is illustrated during a kickdown operation.

First, the controller 118 determines that a kickdown is required (based on driver manipulation of the gear shift lever 202). Trace 802 represents a kickdown request. In order to accomplish the kickdown, the controller 118 sets a desired output acceleration (trace 804) of the transmission. As shown, the desired output acceleration is less than the desired output acceleration of the first control mode.

When the kickdown is requested, electronically controlled solenoids (not shown) begin to actuate the appropriate valves 120, 122, 124 to release and engage the clutches needed to shift the automatic transmission 104.

Engine speed and torque converter turbine speed increase (traces 806, 808, respectively). However due to the smaller desired output acceleration, engine speed and torque converter speed begin to increase at a later time and at a smaller rate than in the first control mode.

Once the output and input speeds reach the desired gear ratio, the shift is completed by fully engaging the correct clutches. As shown in FIG. 8, the clutches are fully engaged and the desired gear ratio is achieved between 4.94 seconds (line segment 810).

Figure 9:
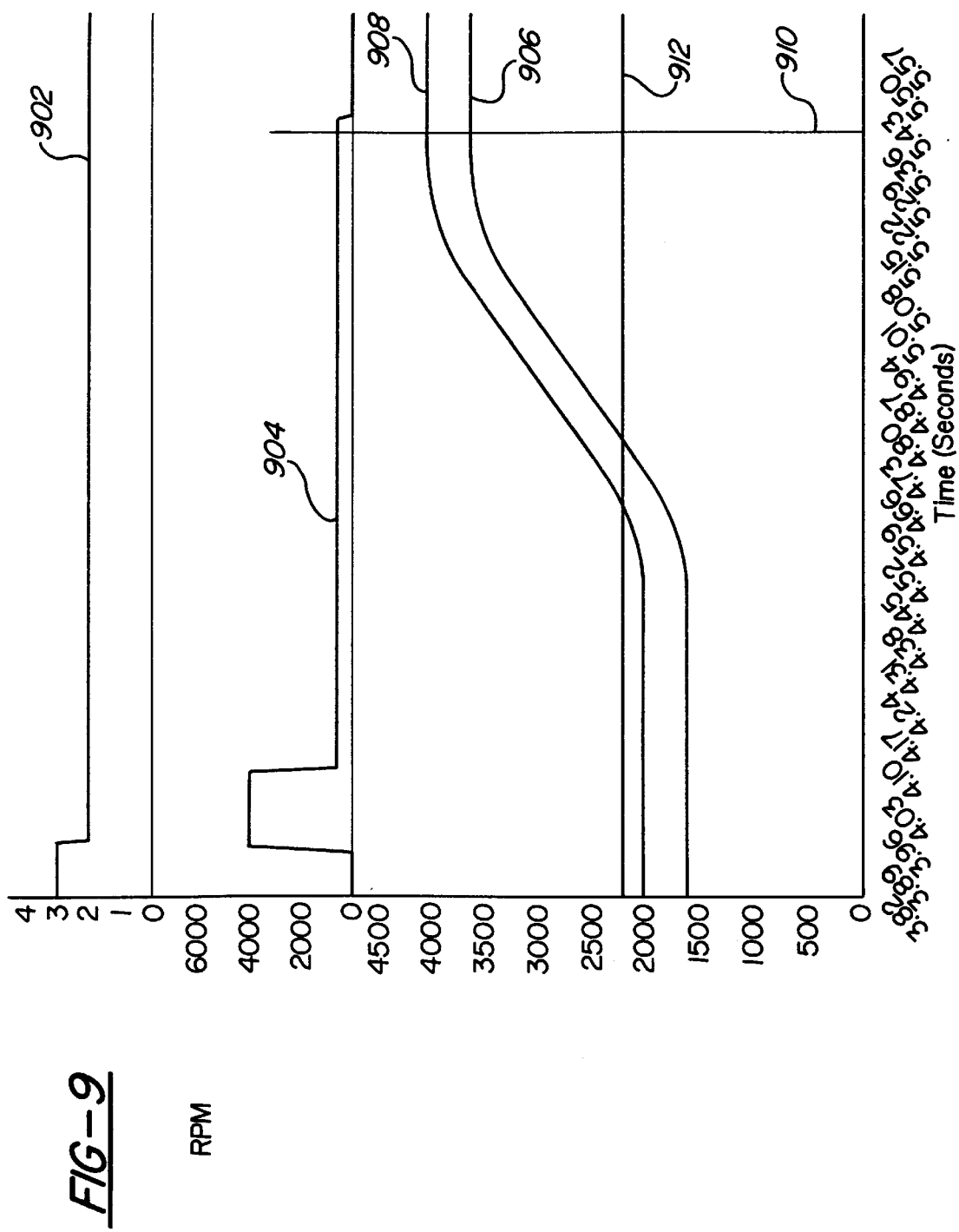
FIG. 9 is an exemplary graph illustrating a kickdown operation of an automatic transmission in a third manual mode, according to an embodiment of the present invention.

With reference to FIG. 9, operation of the automatic transmission 104 and the controller 118 in the third manual mode is illustrated during a kickdown operation.

First, the controller 118 determines that a kickdown is required (based on driver manipulation of the gear shift lever 202). Trace 902 represents a kickdown request. In order to accomplish the kickdown, the controller 118 sets a desired output acceleration (trace 904) of the transmission. As shown, the desired output acceleration is less than the desired output acceleration of the second control mode.

When the kickdown is requested, electronically controlled solenoids (not shown) begin to actuate the appropriate valves 120, 122, 124 to release and engage the clutches needed to shift the automatic transmission 104.

Engine speed and torque converter turbine speed increase (traces 906, 908, respectively). However due to the smaller desired output acceleration, engine speed and torque converter speed begin to increase at a later time and at a smaller rate than in the first and second control modes.

Once the output and input speeds reach the desired gear ratio, the shift is completed by fully engaging the correct clutches. As shown in FIG. 9, the clutches are fully engaged and the desired gear ratio is achieved around 5.43 seconds (line segment 910).

The rate of fluid flow during each of the phases of clutch engagement controls the rate and "feel" of the shifting operation. In the first automatic mode, the kickdown is made more aggressive (than in the second and third manual modes) by providing crisper, quicker downshift times by modifying the rate at which the respective clutches are filled and engaged. This is accomplished by modifying the hydraulic fluid flow rate through the corresponding valves 120,122,124. Likewise, the kickdown in the second manual mode is more aggressive than kickdowns in the third manual mode.

4. Shifting the Transmission to a Higher Gear Ratio

Figure 10:
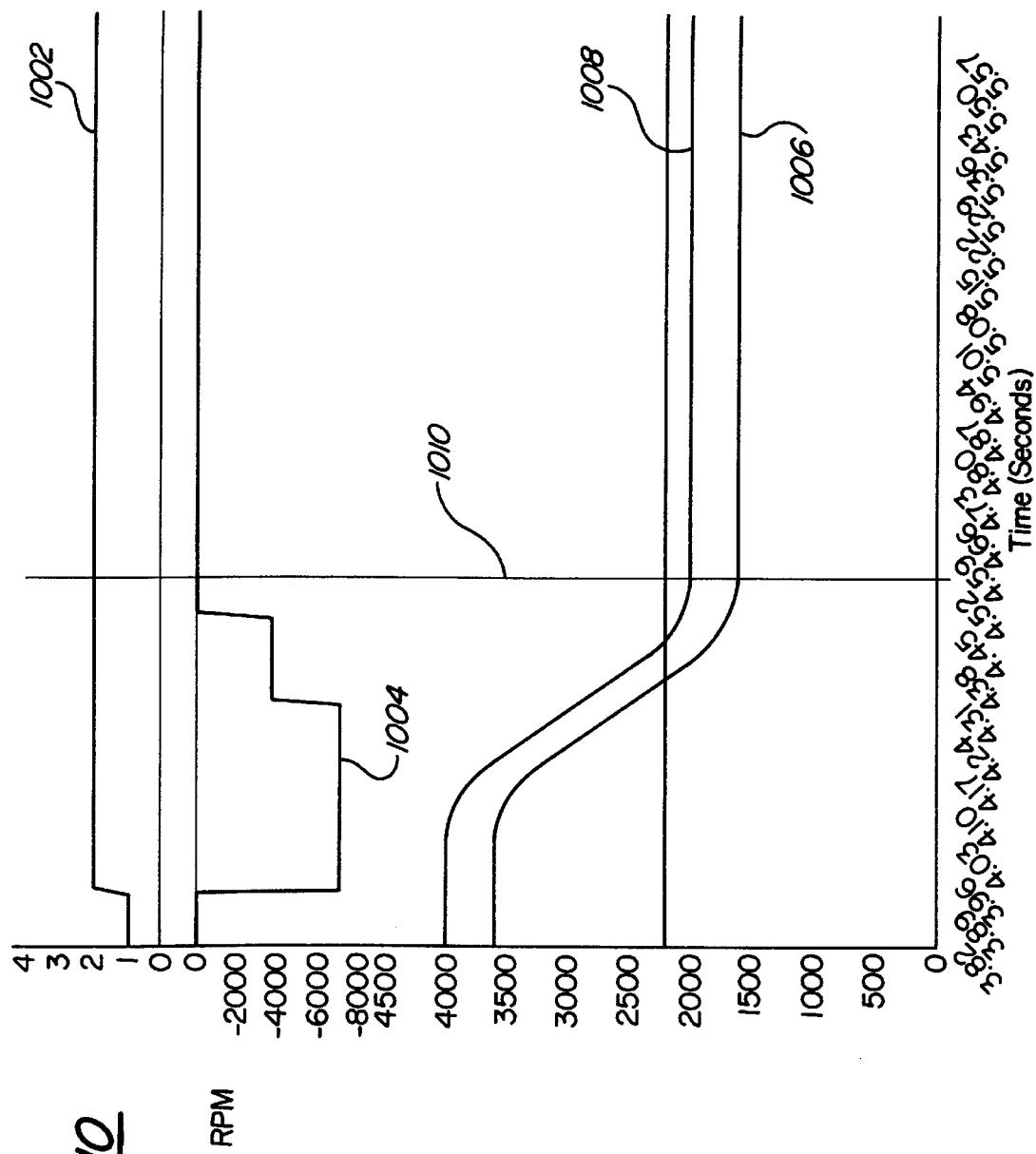
FIG. 10 is an exemplary graph illustrating an upshift operation of an automatic transmission in a first manual mode, according to an embodiment of the present invention.

With reference to FIG. 10, operation of the automatic transmission 104 and the controller 118 in the first manual mode is illustrated during an upshift operation.

First, the controller determines that a upshift is required (based driver manipulation of the gear shift lever 202). The trace 1002 represents the request for a upshift. In order to accomplish the upshift, the controller 118 sets a desired output acceleration (trace 1004) of the transmission. The desired output acceleration is used to determine how quickly the clutches should engage and reach the new gear ratio.

Engine speed and torque converter turbine speed decrease (traces 1006, 1008, respectively). When the transmission controller 118 calls for an upshift, the controller 118 actuates the appropriate valves 120,122, 124 to release and engage the clutches needed to shift the automatic transmission 104. Once the correct gear ratio is achieved (transmission output speed vs. transmission input speed), the controller 118 completely engages the clutches. As shown in FIG. 10, the clutches are fully engaged and the desired gear ratio is achieved at approximately 4.55 seconds (line segment 1010).

Figure 11:
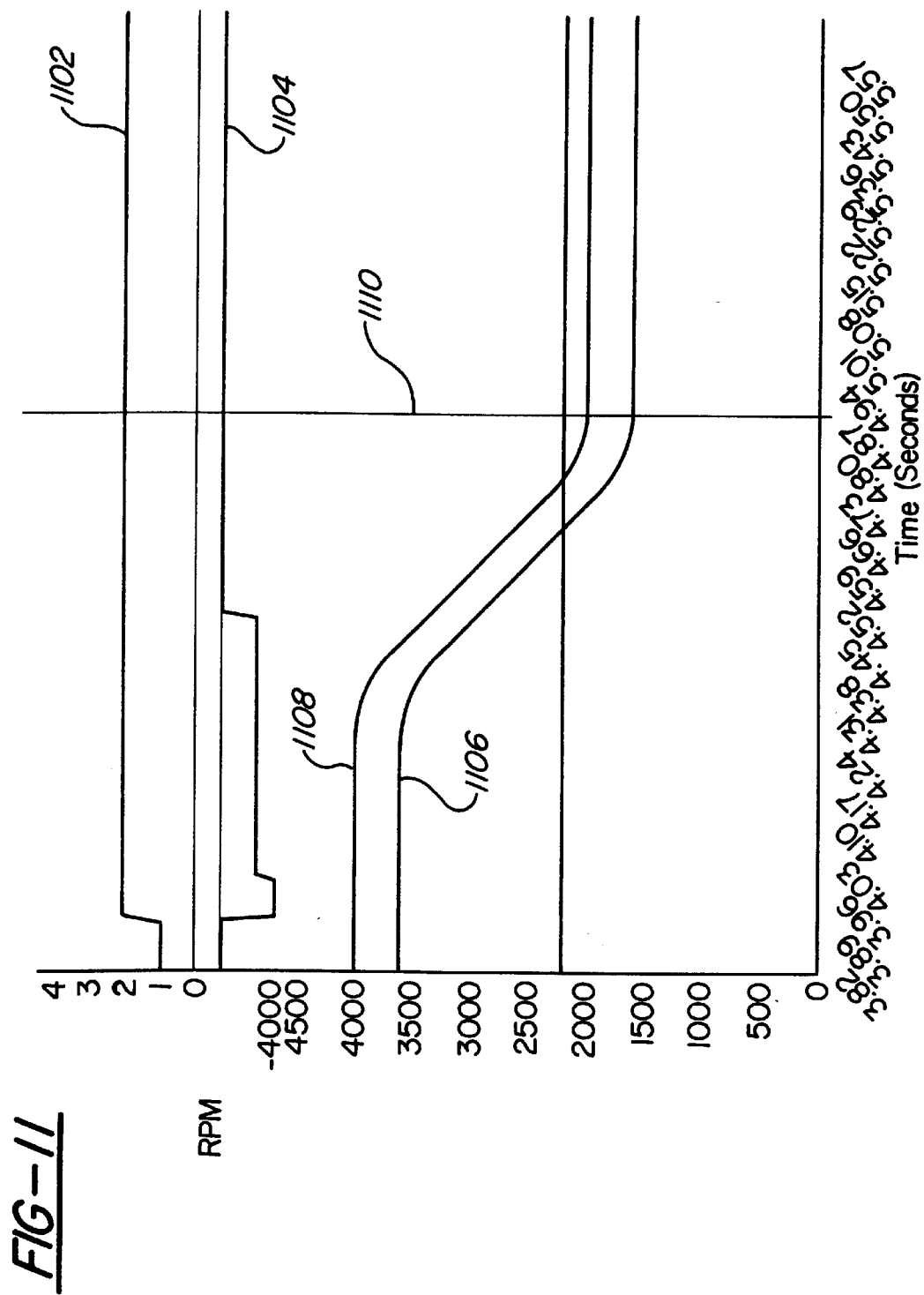
FIG. 11 is an exemplary graph illustrating an upshift operation of an automatic transmission in a second manual mode, according to an embodiment of the present invention; and, FIG. 12 is an exemplary graph illustrating an upshift operation of an automatic transmission in a first third mode, according to an embodiment of the present invention.

With reference to FIG. 11, operation of the automatic transmission 104 and the controller 118 in the second manual mode is illustrated during an upshift operation.

First, the controller 118 determines that an upshift is required (based on driver manipulation of the gear shift lever 202). Trace 1102 represents kickdown request. In order to accomplish the upshift, the controller 118 sets a desired output acceleration (trace 1104) of the transmission. As shown, the desired output acceleration is greater than the desired output acceleration of the first control mode.

When the upshift is requested, electronically controlled solenoids (not shown) begin to actuate the appropriate valves 120, 122, 124 to release and engage the clutches needed to shift the automatic transmission 104.

Engine speed and torque converter turbine speed decrease (traces 806, 808, respectively). However due to the greater desired output acceleration, engine speed and torque converter speed begin to decrease at a later time and at a smaller rate than in the first control mode.

Once the output and input speeds reach the desired gear ratio, the shift is completed by fully engaging the correct clutches. As shown in FIG. 11, the clutches are fully engaged and the desired gear ratio is achieved between 4.94 seconds (line segment 1110).

Figure 12:
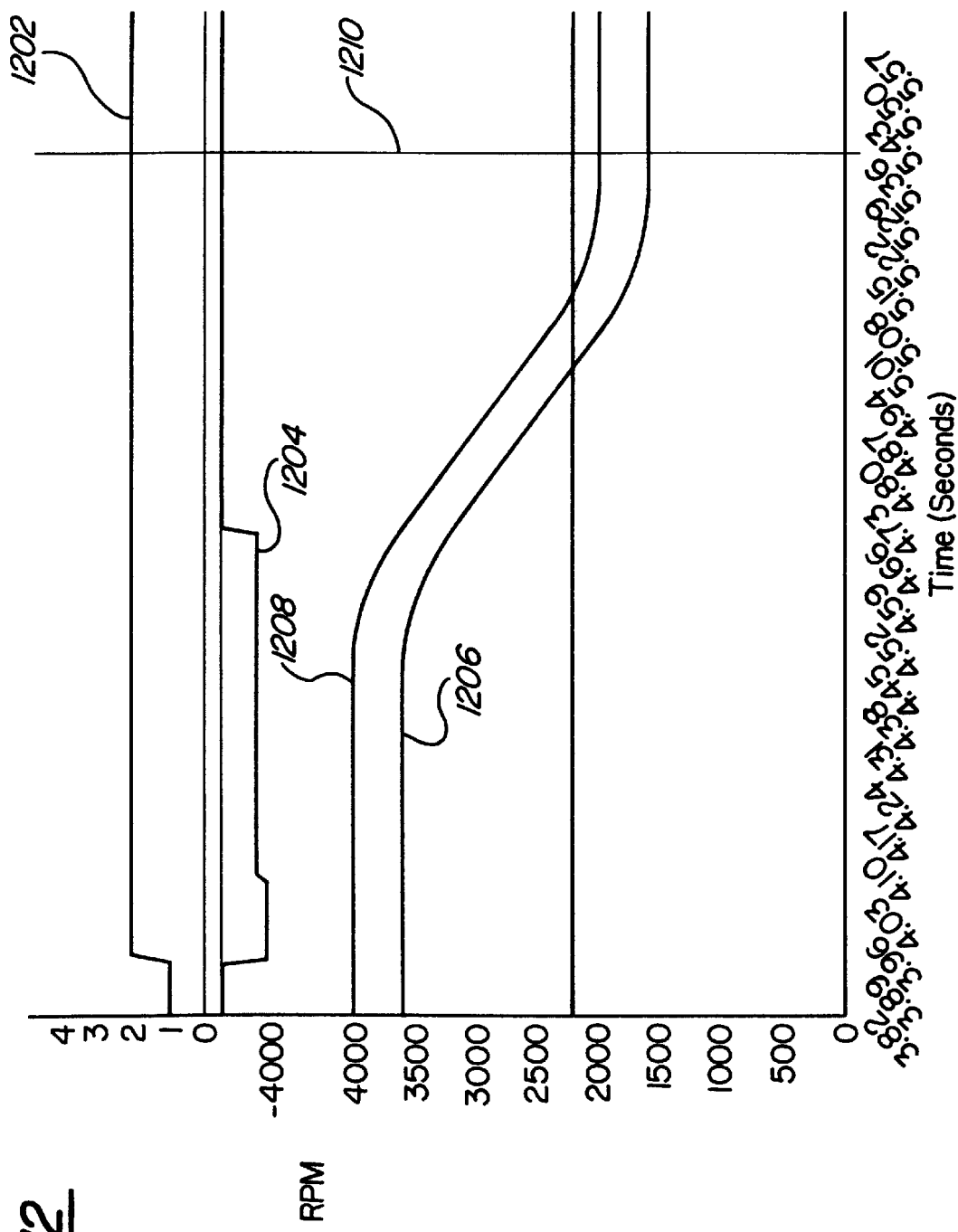

With reference to FIG. 12, operation of the automatic transmission 104 and the controller 118 in the third manual mode is illustrated during an upshift operation.

First, the controller 118 determines that a upshift is required (based on driver manipulation of the gear shift lever 202). Trace 1202 represents the upshift request. In order to accomplish the kickdown, the controller 118 sets a desired output acceleration (trace 1204) of the transmission. As shown, the desired output acceleration is greater than the desired output acceleration of the second control mode.

When the upshift is requested, electronically controlled solenoids (not shown) begin to actuate the appropriate valves 120, 122, 124 to release and engage the clutches needed to shift the automatic transmission 104.

Engine speed and torque converter turbine speed decrease (traces 1206, 1208, respectively). However due to the greater desired output acceleration, engine speed and torque converter speed begin to decrease at a later time and at a smaller rate than in the first and second control modes.

Once the output and input speeds reach the desired gear ratio, the shift is completed by fully engaging the correct clutches. As shown in FIG. 12, the clutches are fully engaged and the desired gear ratio is achieved around 5.43 seconds (line segment 1210).

The rate of fluid flow during each of the phases of clutch engagement controls the rate and "feel" of the shifting operation. In the first automatic mode, the kickdown is made more aggressive (than in the second and third manual modes) by providing crisper, quicker downshift times by modifying the rate at which the respective clutches are filled and engaged. This is accomplished by modifying the hydraulic fluid flow rate through the corresponding valves 120,122,124. Likewise, the kickdown in the second manual mode is more aggressive than kickdowns in the third manual mode.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus, comprising:
   an automatic transmission for a motor vehicle;
   a plurality of sensors coupled to the automatic transmission and the motor vehicle and adapted to sense a plurality of parameters thereof and produce a plurality of respective sensor signals; and,
   an input device responsive to manipulation by a driver and adapted to produce one of an upshift signal and a downshift signal and a mode setting signal in response thereto;
   a controller coupled to the automatic transmission and the input device, and being adapted to receive the mode setting signal and the sensor signals and select one of a first and second manual modes in response thereto and to receive one of the upshift and downshift signals and responsively shift the automatic transmission in response to the sensor signals and the selected one of the first and second manual modes, the controller being programmable to provide first and second sets of operating characteristics thereto.

2. An apparatus, as set forth in claim 1, wherein the controller is adapted to shift the transmission to a higher gear ratio in response to receiving the upshift signal and to shift the transmission to a lower gear ratio in response to receiving the downshift signal.

3. An apparatus, as set forth in claim 2, wherein the controller is adapted to control the rate of shifting operations, the being defined by the first and second sets of operating characteristics.

4. An apparatus, as set forth in claim 3, wherein the first set of operating characteristics define faster, more aggressive shifts than the second set of operating characteristics.

5. An apparatus, comprising:

an automatic transmission for a motor vehicle;

a plurality of sensors coupled to the automatic transmission and the motor vehicle and adapted to sense a plurality of parameters thereof and produce a plurality of respective sensor signals; and, an input device responsive to manipulation by a driver and adapted to produce one of an upshift signal and a downshift signal and a mode setting signal in response thereto;

a controller coupled to the automatic transmission and the input device, and being adapted to receive the mode setting signal and the sensor signals and select one of a first, second and third manual modes in response thereto and to receive one of the upshift and downshift signals and responsively shift the automatic transmission in response to the sensor signals and the selected one of the first, second, and third manual modes, the controller being programmable to provide respective first, second, and third sets of operating characteristics thereto.

6. An apparatus, as set forth in claim 5, wherein the controller is adapted to shift the transmission to a higher gear ratio in response to receiving the upshift signal and to shift the transmission to a lower gear ratio in response to receiving the downshift signal.

7. An apparatus, as set forth in claim 5, wherein the controller is adapted to control the rate of shifting operations, the rate being defined by the first, second and third sets of operating characteristics.

8. An apparatus, as set forth in claim 5, wherein the second set of operating characteristics defined faster, more aggressive shifts than the third set of operating characteristics and the first set of operating characteristics define faster, more aggressive shifts than the second set of operating characteristics.

9. A method for providing first and second manual shift modes for an automatic transmission, including the steps of:

selecting a selected manual mode as one of the first and second manual modes;

sensing a plurality of parameters related to the automatic transmission and producing a plurality of respective sensor signals; and, receiving one of an upshift and a downshift signal in response to manipulation of an input device by a driver;

receiving the sensor signals and the one of the upshift and downshift signals and shifting the automatic transmission as a function of the sensor signals and a first set of operating characteristics in response to the selected manual mode being equal to the first manual mode and a second set of operating characteristics in response to the selected manual mode being equal to the second manual mode.

10. A method, as set forth in claim 9, wherein the step of shifting the automatic transmission includes the steps of:

shifting the transmission to a higher gear ratio in response to receiving the upshift signal; and, shifting the transmission to a lower gear ratio in response to receiving the downshift signal.

11. A method, as set forth in claim 10, wherein steps of shifting the transmission to a higher gear ratio and shifting the transmission to a lower gear ratio include the step of controlling the rate of shifting operations, the rate being defined by the first and second sets of operating characteristics.

12. A method, as set forth in claim 11, wherein the first set of operating characteristics define faster, more aggressive shifts than the second set of operating characteristics.

13. A method for providing first, second, and third manual shift modes for an automatic transmission, including the steps of:

selecting a selected manual mode as one of the first, second, and third manual modes;

sensing a plurality of parameters related to the automatic transmission and producing a plurality of respective sensor signals; and, receiving one of an upshift and a downshift signal in response to manipulation of an input device by a driver;

receiving the sensor signals and the one of the upshift and downshift signals and shifting the automatic transmission as a function of the sensor signals and a first set of operating characteristics in response to the selected manual mode being equal to the first manual mode, a second set of operating characteristics in response to the selected manual mode being equal to the second manual mode and a third set of operating characteristics in response to the selected manual mode being equal to the third manual mode.

14. A method, as set forth in claim 13, wherein the step of shifting the automatic transmission includes the steps of:

shifting the transmission to a higher gear ratio in response to receiving the upshift signal; and, shifting the transmission to a lower gear ratio in response to receiving the downshift signal.

15. A method, as set forth in claim 13, wherein steps of shifting the transmission to a higher gear ratio and shifting the transmission to a lower gear ratio include the step of controlling the rate of shifting operations, the rate being defined by the first, second, and third sets of operating characteristics.

16. A method, as set forth in claim 13, wherein the second set of operating characteristics defined faster, more aggressive shifts than the third set of operating characteristics and the first set of operating characteristics define faster, more aggressive shifts than the second set of operating characteristics.

* * * * *